United States Patent [19]
Baltus et al.

[11] Patent Number: 5,166,956
[45] Date of Patent: Nov. 24, 1992

[54] DATA TRANSMISSION SYSTEM AND APPARATUS PROVIDING MULTI-LEVEL DIFFERENTIAL SIGNAL TRANSMISSION

[75] Inventors: Peter G. Baltus, Sunnyvale; Pieter S. van der Meulen, Santa Clara, both of Calif.

[73] Assignee: North American Philips Corporation, New York, N.Y.

[21] Appl. No.: 526,925

[22] Filed: May 21, 1990

[51] Int. Cl.⁵ .................... H04L 25/34; H04L 25/49
[52] U.S. Cl. ........................................ 375/17; 341/56; 375/36
[58] Field of Search ............... 375/17, 36, 38, 27; 341/56, 57

[56] References Cited

U.S. PATENT DOCUMENTS

| | | | |
|---|---|---|---|
| 4,084,069 | 4/1978 | Looschen | 375/17 |
| 4,489,417 | 12/1984 | Askin et al. | 375/17 X |
| 4,606,046 | 8/1986 | Ludwick | 375/17 |

FOREIGN PATENT DOCUMENTS 3218318 11/1983 Fed. Rep. of Germany .

Primary Examiner—Curtis Kuntz
Assistant Examiner—Tesfaldet Bocure
Attorney, Agent, or Firm—Leroy Eason

[57] ABSTRACT

A data transmission system which provides differential transmission of a multi-level interface corresponding to a binary interface formed by a plurality of binary input signals. The binary interface is encoded by an encoder into a corresponding multi-level differential interface formed by a plurality of multi-level signals, such correspondence being in accordance with a pre-selected code conversion table, and the respective multi-level signals are transmitted over respective transmission channels. Upon reception at a decoder, the signs of the differences between respective pairs of the multi-level signals are detected, and in accordance with such signs binary values are assigned to respective binary output signals of the decoder in accordance with the inverse of the code conversion table employed for encoding. Differential transmission achieves immunity from common mode noise, and multi-level encoding requires fewer channels than would be necessary for binary differential transmission.

12 Claims, 3 Drawing Sheets

FIG.I
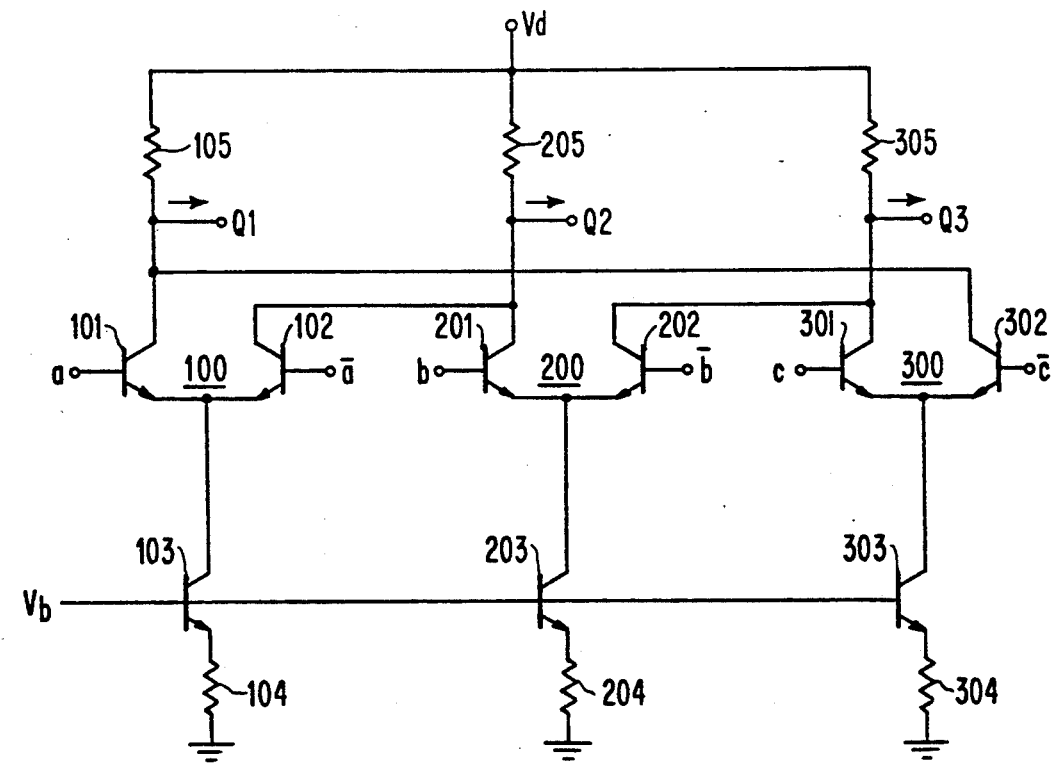
FIG.2
FIG.3

| a | b | c | Q1 | Q2 | Q3 |
|---|---|---|----|----|----|
| 0 | 0 | 1 | 2  | 1  | 0  |
| 0 | 1 | 0 | 1  | 0  | 2  |
| 0 | 1 | 1 | 2  | 0  | 1  |
| 1 | 0 | 0 | 0  | 2  | 1  |
| 1 | 0 | 1 | 1  | 2  | 0  |
| 1 | 1 | 0 | 0  | 1  | 2  |

FIG. 4a

| Q1 | Q2 | Q3 | b1 | b2 | b3 |
|----|----|----|----|----|----|
| 2  | 1  | 0  | 0  | 0  | 1  |
| 1  | 0  | 2  | 0  | 1  | 0  |
| 2  | 0  | 1  | 0  | 1  | 1  |
| 0  | 2  | 1  | 1  | 0  | 0  |
| 1  | 2  | 0  | 1  | 0  | 1  |
| 0  | 1  | 2  | 1  | 1  | 0  |

FIG. 5

|                    | SINGLE-ENDED TRANSMISSION | | DIFFERENTIAL TRANSMISSION | |
|--------------------|:---:|:---:|:---:|:---:|
| SIGNAL LEVELS:     | 2 | n | 2 | n |
| CHANNEL:           | n | n | n | n |
| NO. OF SYMBOLS:    | $2^{n-1}$ | $n^{n-1}$ | $2^{n/2}$ | $n!$ |
| BITS PER SYMBOL:   | $n-1$ | $\log_2(n^{n-1})$ | $n/2$ | $\log_2(n!)$ |
| SETTLE TIME:       | $T \ln(2)$ | $T \ln(2n-2)$ | $T \ln(2)$ | $T \ln(n)$ |
| ITR:               | $\dfrac{n-1}{T \ln(2)}$ | $\dfrac{\log_2(n^{n-1})}{T \ln(2n-2)}$ | $\dfrac{n}{2T \ln(2)}$ | $\dfrac{\log_2(n!)}{T \ln(n)}$ |

DATA TRANSMISSION SYSTEM AND APPARATUS PROVIDING MULTI-LEVEL DIFFERENTIAL SIGNAL TRANSMISSION

BACKGROUND OF THE INVENTION

1. Field of the Invention

The invention relates to a data transmission system wherein the binary data is transmitted in the form of multi-level differential signals over respective transmission channels, and the received signals are decoded on the basis of the signs of the differences between pairs of such signals rather than their magnitudes. A high transmission rate and immunity from common mode noise is thereby achieved, and with fewer channels than would be required for differential transmission in binary form. As used herein the term "multi-level" refers to more than two possible levels, two levels being characteristic of binary signals.

2. Description of the Related Art

Transmission of binary data is most commonly effected by employing a binary single-ended interface, the signals in the respective transmission channels corresponding to respective bits of the binary data. The group of signals on all channels is commonly referred to as an "interface", and in the absence of noise a binary single-ended interface makes the most efficient use of channel capacity. Such interfaces are, however, subject to transmission error when there is common mode noise on the channels; i.e., noise occurring substantially to the same extent on all channels, since decoding of the received signals requires detection of their amplitudes relative to a fixed reference level.

Multi-level rather than binary interfaces have been employed in order to obtain an increased information transmission rate over a given number of channels, the value of the signal in each channel being at any of several possible levels which respectively correspond to several binary data bits. See, for example, U.S. Pat. No. 4,606,046, issued Apr. 12, 1986. However, such interfaces still encounter the common mode noise problem, since decoding of the received multi-levels requires comparison with a fixed reference level.

It has also been recognized that the problem of common mode noise in transmission can be substantially eliminated by encoding the binary data in differential form, each bit thereof being represented by the difference between signals on a pair of lines, since such a difference will not be affected by equal changes in the amplitudes of the signals on both lines. Also, only the sign (rather than the magnitude) of the signal difference need be detected. However, binary differential transmission necessitates double the number of lines for transmitting a given number of data bits, as well as double the number of pin connections at the encoder and decoder. That is a significant disadvantage when such circuits are included in an IC package comprising further circuits and there are only a limited number of available pin connections.

Consequently, there is need for a data transmission system which provides a high information transmission rate together with common mode noise suppression, and which requires fewer transmission channels than necessary for binary differential transmission.

SUMMARY OF THE INVENTION

A data transmission system in accordance with the invention provides multi-level differential transmission of binary data over a plurality (m) of transmission channels such as wires, lines, frequency bands, etc. The system comprises an encoder for receiving the binary interface formed by the binary signals to be transmitted and encoding such binary interface into a multi-level differential interface, each multi-level signal being assigned a value at any of a number (n) of different levels and all such signals having different values. For optimum utilization of channel capacity, (n) should be equal to (m). The value so assigned to each multi-level signal is derived as an arithmetic combination of the binary values of a respective group of the binary signals, i.e. two or more, such correspondence being in accordance with a pre-selected code conversion or so-called "mapping" table. The encoder supplies the respective multi-level signals to the respective transmission channels. A decoder receives the transmitted multi-level signals, determines the signs of the differences in values of respective pairs thereof, and in accordance with such sign differences assigns binary values to respective binary output signals of the decoder, such assignments being in accordance with the inverse of the same code conversion table as employed for encoding. A decoded binary interface is thereby obtained which is the same as the original transmitted binary interface. Immunity from common mode noise is obtained as a result of differential signal transmission, and the number of channels which are required is less than would be necessary for differential transmission of the original binary interface.

The invention also relates to an encoder and a decoder for use in such a system.

BRIEF DESCRIPTION OF THE DRAWINGS

FIG. 1 shows in block form a data transmission system in accordance with the invention;

FIG. 2 is an example of a code conversion table such as can be employed for converting a binary input signal into a multi-level signal;

FIG. 3 is a circuit drawing of an encoder such as may be employed in the system of FIG. 1.

FIG. 4a shows how the code conversion table in FIG. 3a is employed inversely by such decoder;

FIG. 5 is a comparison of significant characteristics of single-ended and differential transmission of binary signals and multi-level signals.

DESCRIPTION OF THE PREFERRED EMBODIMENTS

Figures 3A, 4:
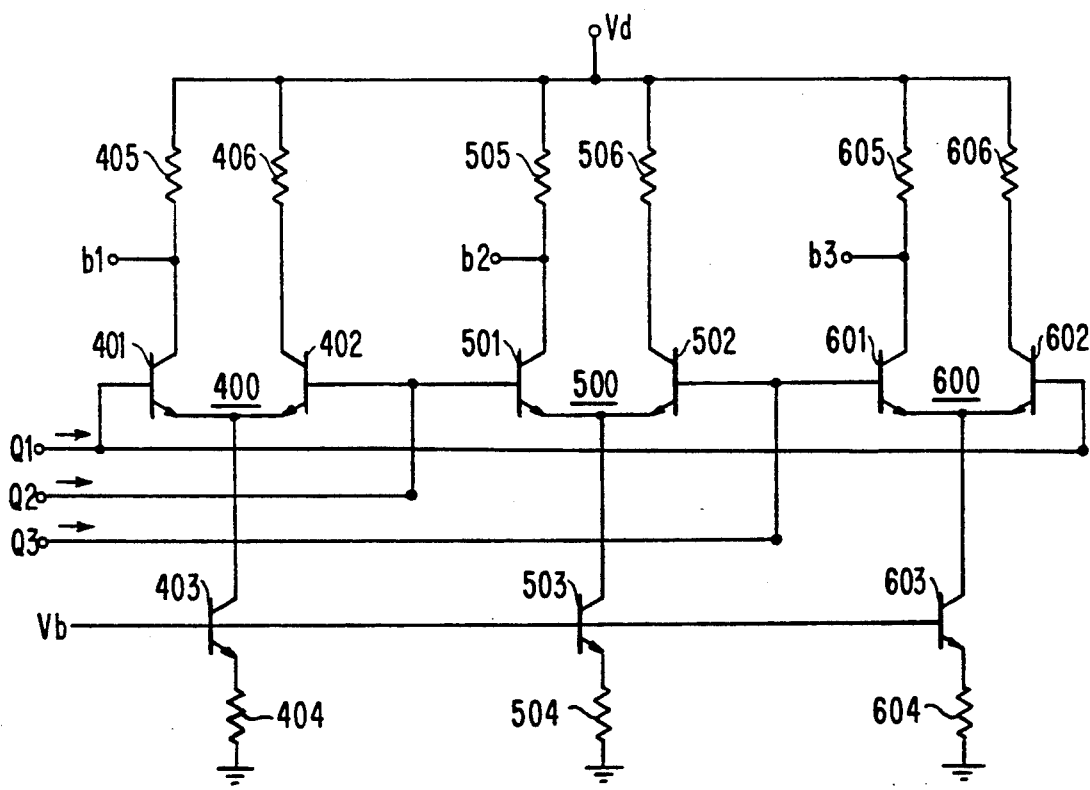
FIG. 3a shows a code conversion table such as may be employed by such encoder.
FIG. 4 is a circuit drawing of a decoder such as can be employed in the system in FIG. 1.

Binary data symbols, corresponding to specific information, can be transmitted in the form of signals of different values over respective transmission channels such as, for example, the wires of a transmission bus; each permutation of signal values representing a particular data symbol. The simplest encoding of data into signals is binary, the value of each signal being at either a high ($V_h$) or a low ($V_o$) voltage level. Thus, two wires can carry two bits of binary information, one bit per wire. A ground reference wire is also necessary. Binary differential encoding obviates the need for a ground wire, but at least two wires have generally been considered necessary for each bit since the value of each bit is then represented by the sign (+ or −) of the difference between the signals on a pair of wires. Thus, for encoding two bits it has been considered necessary to employ four wires, the values of the bits being determined from the signs of the differences between the signals on two different pairs of such wires, such as ($w_1-w_2$) and ($w_3-w_4$). It is apparent, however, that since there are six possible pairs of the four wires, at least one more bit could be transmitted by assigning to such bit the sign value of another pair, such as ($w_1-w_3$), which can be chosen independently of the sign values of the first two pairs. In general, if the number of wires is (m) the number (p) of different wire pairs will be $$\frac{m(m-1)}{2}.$$

To make use of this, however, it is necessary for the signal on each wire to have more than just two possible levels. By employing additional signal levels rather than additional wires, it is possible to differentially encode a greater number of bits than the number of wires.

In general, a multi-level differential encoder may have (m) wires over which information is differentially transmitted using (n) different signal levels. That is, the value of the signal on each wire can be at any of the levels 1, 2, ... n. In order to determine the values of the signals on each of the (m) wires from the differences between pairs of such signals (differential detection) two conditions should be met:

(1) no two signals should be at the same level; and
(2) each of the n levels should be assigned to at least one wire signal.

If $m > n$, one or more signal levels will have to be assigned to at least two wires. It is then not possible to use the difference between the values of the signals on that pair of wires to derive any information, and so the information transmission rate of the wires is not fully utilized. If $m < n$, then for each transmission there will be some signal levels which cannot be assigned to wires and so cannot be used to convey any information. It must therefore be concluded that the optimum condition is achieved when $m = n$; i.e., the number of channels should be equal to the number of signal levels in order to make optimum use of the channel capacity.

Since each permutation of the values of the signals on all wires constitutes a "symbol", the number of symbols which can be transmitted is n! That is, the signal on the first wire can have any of n values, the signal on the second wire can have any of (n−1) values, and so on to the last wire. The four-wire encoder discussed above would therefore be capable of transmitting 4!=24 different symbols, which exceeds 4 bits of information ($2^4 = 16$).

The encoding operation for assigning signal values at any of n levels to n channels may be carried out by the following algorithm;

(1) assign any value to the signal on wire $w_1$;
(2) for any wire $w_i$ from $w_2$ to $w_{n-1}$, assign a value which differs from those assigned to wires $w_1$ to $w_{i-1}$;
(3) assign the remaining value to the signal on wire $w_n$.

For example, for a three-wire, three-level encoder, the three levels being $V_1 < V_2 < V_3$, assign any of such levels, e.g. $V_3$, to the signal on wire $w_1$. For the signal on wire $w_2$ the assigned level must be $V_1$ or $V_2$, e.g. $V_1$. This leaves only $V_2$ as the level to be assigned to the signal on wire $w_3$. By encoding in this way, it is seen that all wires will be at different signal levels. After transmission the values of the signals on the respective wires can be determined by detecting only the signs of the differences between the signals on each pair of wires, because such differences establish a sequence of relative signal values and the value of the signal on any wire must correspond to its position in such sequence. In the present example, sorting the differences between the values of the signals on pairs of the wires gives the following results:

| wire pair | signal difference | wire sequence |
|---|---|---|
| ($w_1-w_2$) | $V_3 - V_1 > 0$ | $w_1 > w_2$ |
| ($w_2-w_3$) | $V_1 - V_2 < 0$ | $w_2 < w_3$ |
| ($w_1-w_3$) | $V_3 - V_2 > 0$ | $w_1 > w_3$ |

Consequently, $w_1 > w_3 > w_2$, and so the signal sequence must be $V_3$ on wire $w_1$, $V_2$ on wire $w_3$, and $V_1$ on wire $w_2$. In the wire order $w_1$, $w_2$, $w_3$, such signal sequence is $V_3$, $V_1$, $V_2$, which is the same as the signal levels originally assigned to those wires. This correspondence will, of course, be true regardless of which of the levels ($V_1$, $V_2$ and $V_3$) were originally assigned to the signals on the respective wires.

The decoding operation can be effected using the following algorithm;

(1) detect the signs $S_{ij}$ of the differences ($v_i$-$v_j$) between the values of the signals on any pair of wires in positions i and j in the wire sequence;
(2) find the signal value $v_i$ for which $S_{ij} = 1$ for all j, and assign that signal value to wire $w_i$;
(3) disregard signal value $v_i$ and sign $S_{ij}$;
(4) repeat steps (2) and (3) until all signal values have been assigned.

The signal values assigned by this iterative procedure are determined by their sequential order, each being one level below that of the preceding assigned signal value. The last signal value assigned will be at the lowest or "zero" level.

Referring to FIG. 1, there is shown in block form a data transmission system in accordance with the invention. Although any number of lines and signal levels can be employed, to simplify the description FIG. 1 shows a 3-line 3-level system. It comprises an encoder 1 having three inputs for receiving in parallel three binary input signals, and three outputs each of which is assigned a value at any of three voltage levels $V_1 < V_2 < V_3$, the outputs being respectively connected to respective channels $w_1$, $w_2$, $w_3$ of a transmission bus. At the receiving end of the bus the wires $w_1$, $w_2$, $w_3$ are respectively connected to three inputs of a decoder 2 having three outputs at which three binary output signals are produced.

The encoder assigns signal values to the respective output lines in accordance with arithmetic combinations, such as summations of the values of respective groups, in this case pairs, of the binary input signals. Such assignments are pursuant to any arbitrarily selected multi-level differential code such that no two output line signals will have the same code value; for example, a tri-level differential code as shown by the table in FIG. 2. This was formulated by assigning a different one of the six possible multi-level differential interfaces (or symbols) formed by the tri-level output signals) to each of six possible interfaces (or symbols) formed by the binary input signals. It will be noted that since 3!=6, while $2^3=8$, with three lines there will be two possible binary input interfaces (or symbols) which cannot be represented by tri-level differential output interfaces (or symbols) and so cannot be transmitted by three-wire differential transmission.

In general, with (n) levels the number of different multi-level interfaces is n!, while the number of binary interfaces which can be formed by (p) binary bit signals is $2^p$. When n=m, the number of channels, the number of possible different pairs of channels will be $$\frac{n(n-1)}{2}.$$

Since each such pair is capable of differential transmission of one binary bit the number (p) of binary bits will also be $$\frac{n(n-1)}{2}.$$

However, since n! and $2^p$ will almost always be different, it is not possible to map all of the possible binary input interfaces with respective multi-level output interfaces. For example, if n=m=4, then p=6 and so there could be 6 binary signals. These can form $2^6=64$ different binary interfaces, but only 4!=24 multi-level interfaces can be formed at the output of the encoder. It would, of course, be possible to utilize fewer binary input signals, for example 4 providing 16 different binary interfaces, and to employ the remaining 8 possible multi-level interface at the output of the encoder for transmission of handshaking, synchronization, error and other information.

Upon reception of the three multi-level signals at the decoder, the signs of the differences between different pairs of such signals, ($w_1-w_2$), ($w_2-w_3$) and ($w_1-w_3$), are detected. As described above, from the signs of such differences the multi-level values of the signals on each of the three input lines are determined. The three outputs are then assigned binary values corresponding to the multi-level input signals in accordance with the same code conversion table as had been employed for encoding, as shown in FIG. 2. For example, if the three differences between the output line signals establish that $w_1<w_2$, $w_2>w_3$, and $w_1>w_3$, it follows that $w_2>w_1>w_3$. Consequently, line $w_1$ has the signal value $V_2$, line $w_2$ has the signal value $V_3$, and line $w_3$ has the signal value $V_1$. This sequence, $V_2$, $V_3$, $V_1$, is seen from the code conversion table in FIG. 2 as corresponding to binary code 011. Consequently, decoder 2 assigns that sequence of binary values to the signals on output lines $w_1$, $w_2$, $w_3$.

The encoder and decoder can be implemented in any of various types of integrated circuit technologies, including but not limited to CMOS, BiCMOS and Bipolar. For purposes of illustration, they have been shown in FIGS. 3 and 4 as Bipolar transistor circuits but it is clear that field-effect transistor could alternatively could be used.

The 3-level 3-line encoder in FIG. 3 receives binary input signals a, b, c of descending order of significance at the inputs of three successive differential amplifier stages 100, 200 and 300. Each such stage consists of a pair of emitter-coupled transistors coupled to a constant current source in the form of a transistor biased to operate on the horizontal part of its collector-current characteristic. Thus, stage 100 comprises transistors 101 and 102, the emitters of which are connected to the collector of a transistor 103, the emitter of transistor 103 being returned to ground by a resistor 104. The base of transistor 103 is connected to a source of bias volta $V_b$ which biases it so that its collector current remains substantially constant. The collector of transistor 101 is connected by a resistor 105 to a supply source $V_d$. The elements of differential amplifier stages 200 and 300 are the same as those of 100, corresponding elements thereof being identified by corresponding numerals in the 100, 200 and 300 series. The collector of transistor 102 in stage 100 is cross-connected to the collector of transistor 201 in stage 200, the collector of transistor 202 in stage 200 is cross-connected to the collector of transistor 301 in stage 300, and the collector of transistor 302 in stage 300 is cross-connected to the collector of transistor 101 in stage 100. The bases of transistors 101, 201 and 301 respectively receive the binary input signals a, b, c, and the bases of transistors 102, 202, and 302 respectively receive the complements of such signals $\bar{a}$, $\bar{b}$ and $\bar{c}$. This presumes that each input binary signal and its complement is available. If only single-ended binary signals are available, the bases of transistors 102, 202 and 302 can be connected instead to a source of reference voltage at a level between the levels corresponding to a "1" and a "0" value of a binary signal. The collector voltage of transistor 101 is taken as the output signal Q1 of stage 100, the collector voltage of transistor 201 taken as the output signal Q2 of stage 200, and the collector voltage of transistor 301 is taken as the output signal Q3 of stage 300. Q1, Q2 and Q3 together constitute a tri-level code combination which corresponds, or is "mapped", to the input binary signal in accordance with the code conversion table in FIG. 3a, the signal levels 0, 1, 2 in such table corresponding to low ($V_1$), intermediate ($V_2$) and high ($V_3$) different voltage levels produced at the outputs of the encoder circuit and which preferably are equally spaced.

The signal Q1 is determined by the sum of the currents through transistors 101 and 302 and so corresponds to the sum of the signals "a" and "$\bar{c}$" at the bases of those transistors. If both those signals are a binary "0", transistors 101 and 302 will both be in a low or non-conductive state. There will then be minimal current in resistor 105 and so the value of signal Q1 will be at the high voltage level $V_3$. If the "a" and "$\bar{c}$" signals are both binary "1"s, transistors 101 and 302 will both be fully conductive. Since only one of the transistors in each differential stage at a time can be fully conductive, and the total emitter current of both remains constant, if such current is denoted as one current unit there will therefore be a total of two current units through resistor 105. The value of signal Q1 will then be at the low voltage level $V_1$. Finally, if the "a" and "$\bar{c}$" signals are a combination of a "0" and "1", one of transistors 101 and 302 will be in the low conductive state and the other will be fully conductive. There will then be one current unit through resistor 105, and so the value of signal Q1 will be at the intermediate voltage level $V_2$.

Since a "1" input bit produces one current unit at the collector of the transistor which receives it, resulting in a one level reduction from the maximum level $V_3$ of the output signal at such collector, the value of the signal Q1 will be proportional to the difference between $V_3$ and the arithmetic sum of "a" and "$\bar{c}$". If the value of signal Q1 is denoted $V_{Q1}$, this can be expressed as:

$$V_{Q1} = V_3 - \Delta V(a+\bar{c}),$$

where $\Delta V$ is the voltage difference between successive signal levels. If the signal levels $V_1$, $V_2$, $V_3$ signify 1, 2 and 3, and levels 1 and 2 are the same as those for the binary values "0" and "1", this equation becomes $$V_{Q1} = 2 - (a + \bar{c}),$$

A similar analysis applies to the output signals Q2 and Q3 which respectively correspond to $(\bar{a}+b)$ and $(\bar{b}+c)$, resulting in $$V_{Q2} = 2 - (\bar{a} + b),$$

$$V_{Q3} = 2 - (\bar{b} + c).$$

Applying these relationships to, for example, the first line of the table in FIG. 3a, the input binary signal is 001 and so a=0, b=0, c=1, and also $\bar{a}=1$, $\bar{b}=1$, and $\bar{c}=0$. Substituting these values in the above equations, it results that $V_{Q1}=2$, $V_{Q1}=1$, $V_{Q3}=0$. For the second line in the table, the input binary signal is 010 and so a=0, b=1, and c=0. Substituting these values in the above equations, it results that $V_{Q1}=1$, $V_{Q2}=0$, $V_{Q3}=2$. The outputs corresponding to the binary signals in the remaining lines of the table are similarly derived from the above relationships between the input binary signals and the values of the outputs of the decoder in FIG. 2.

It should be noted that although the 3-line 3-level encoder in FIG. 3 derives its outputs in accordance with the arithmetic sums of pairs of the binary input signals, when a greater number of interface levels is employed the outputs of the encoder will depend on combinations of groups of more than two of the input signals. For example, with a 4-level interface each multi-level output signal will be derived from an arithmetic combination of a group of 3 of the binary input signals.

It should also be noted that the division of current between the transistors of any of the differential stages depends only on the relative base voltages of the two transistors of such stage, not on the absolute values of such voltages. Consequently, if both increase or decrease by the same amount that will not alter the current in the collector resistor of such stage. Thus, common mode noise affecting both base voltages will have no effect on the output of such stage.

FIG. 4 shows a bipolar implementation of a decoder for the multi-level signals Q1, Q2, Q3 respectively received over the three respective lines of a transmission bus from an encoder such as that in FIG. 3. Similar to the encoder, the decoder also comprises three differential amplifier stages 400, 500 and 600, one for each possible pair of signals, each including a pair of emitter-coupled transistors connected to a constant current source in the form of a transistor biased to operate on the horizontal part of its collector-current characteristic. Stage 400 includes transistors 401 and 402, the emitters of which are connected to the collector of a transistor 403 which serves as a constant current source, the emitter of transistor 403 being returned to ground by resistor 404. The base of transistor 403 is connected to a source of bias voltage $V_b$ to maintain a substantially constant collector current. The collectors of transistors 401 and 402 are respectively connected by resistors 405 and 406 to a source of supply voltage $V_d$. The elements of differential stages 500 and 600 are the same as those of 400, corresponding elements thereof being identified by corresponding numerals in the 400, 500 and 600 series.

The respective binary outputs $b_1$, $b_2$, $b_3$ produced by the decoder are obtained at the collectors of transistors 401, 501 and 601. Considering transistor 401, its collector current is determined by the difference (Q1−Q2) between the line signals Q1 and Q2 respectively supplied to the bases of transistors 401 and 402. Since the total current through both transistors is held constant, and can be designated as one current unit, there cannot be more than one current unit through either collector resistor 405 or collector resistor 406. Consequently, there will be one current unit through resistor 405 when the line signal Q1 at the base of transistor 401 exceeds the line signal Q2 at the base of transistor 402. There will be substantially no current through collector resistor 405 when Q1<Q2. The collector voltage of transistor 401, which constitutes the binary output signal $b_1$, therefore changes from the maximum or "1" level to the minimum or "0" level when the difference (Q1−Q2) changes from negative to positive. Consequently, $$b_1 = \text{Sign}(Q2 - Q1).$$

By a similar analysis, the binary output signal $b_2$ at the collector of transistor 501 in stage 500, and the binary output signal $b_3$ at the collector of transistor 601 in stage 600, are given by $$b_2 = \text{Sign}(Q3 - Q2), \text{ and}$$

$$b_3 = \text{Sign}(Q1 - Q3).$$

The table in FIG. 4a shows how these relationships result in differential decoding of the input tri-level signals Q1, Q2, Q3 to derive output binary signals $b_1$, $b_2$, $b_3$ forming a binary interface the same as that formed by the binary input signals to the encoder in FIG. 3. For example, the first line of such table is for an input signal such that Q1=2, Q2=1 and Q3=0. The sign of (Q2−Q1) is therefore negative, resulting in binary signal $b_1=0$; the sign of (Q3−Q2) is also negative, resulting in binary signal $b_2=0$; and the sign of (Q1−Q3) is positive, resulting in binary signal $b_3=1$. The decoder output signals $b_1$, $b_2$, $b_3$ therefore correspond to 001, the same as the binary signals which had been encoded and transmitted as the multi-level signal Q1=2, Q2=1, Q3=0.

The second line of the table in FIG. 4a is for an input interface such that Q1=2, Q1=1, Q3=0. Consequently, (Q2−Q1) is negative and so $b_1=0$; (Q3−Q2) is positive and so $b_2=1$; and (Q1−Q3) is negative and so $b_3=0$. The decoder outputs $b_1$, $b_2$, $b_3$ therefore correspond to 010, the same as the original binary signals which had been encoded and transmitted as the multi-level signals Q1=1, Q2=0, Q3=1. The table in FIG. 4a shows that all six possible combinations of the multi-level input signals result in binary output signals having the same binary values as those which had been originally encoded and transmitted as multi-level signals.

Although the number of different symbols that can be transmitted over an n-channel n-level differential interface is equal to n!, the rate at which information can be transmitted does not increase as fast as this would imply as the value of "n" is increased. That is because, due to the time constant τ of each channel, with an increasing number of signal levels a longer time is required for all signals to finally reach or "settle" at their assigned levels. If the amount of information that can be transmitted per unit time is denoted as the Information Transmission Rate ("ITR"), and the number of symbols (T) that can be transmitted per unit time is denoted as the Symbol Transmission Rate ("STR"), then ITR is given by $$ITR = STR \log_2 T$$

where $\log_2 T$ is the number of bits represented by the T symbols during each transmission.

The table in FIG. 5 shows a comparison between single-ended and differential transmission for different values of "n", the number of signal levels. It is seen that in the case of single-ended transmission the information transmission rate for a multi-level interface is lower than for a binary differential interface, while the reverse is true for differential transmission. This is due to the higher redundancy inherent in binary differential interfaces.

While the invention has been described with reference to certain preferred embodiments thereof, it will be apparent to those skilled in the art that various modifications and adaptations thereof may be made without departing from the essential teachings and scope of the present invention as set forth in the ensuing claims.

What is claimed is:

1. A multi-level differential encoder for use in a data transmission system for differential transmission over a plurality of transmission channels of binary interfaces formed by a plurality of binary input signals, the number of channels being less than twice the number of binary input signals; said encoder comprising:

means for receiving a binary interface formed by the binary input signals and converting it into a multi-level differential interface formed by a plurality of code signals, the respective code signals being assigned values corresponding to respectively different levels of a multi-level code; the number of code signals, the number of code values and the number of channels all being equal; whereby the code values of the respective code signals are represented by the signs of the differences between the code values of respective pairs of such code signals;

the code value so assigned to any code signal being in accordance with a combination of the binary values of at least a pair of the binary input signals, the relation between the code values so assigned and said combination of binary values being as provided by a pre-selected code conversion table; and means for supplying the respective code signals to the respective transmission channels.

2. An encoder as claimed in claim 1, wherein successive level of said multi-level code are equally spaced from each other.

3. An encoder as claimed in claim 2, wherein said combination of the binary values of at least a pair of said binary input signals is the sum of such binary values.

4. An encoder as claimed in claim 1 comprising a succession of differential amplifier stages, the respective stages receiving the respective binary input signals and deriving therefrom the respective multi-level code signals in accordance with said pre-selected code conversion table.

5. An encoder as claimed in claim 4 wherein said differential amplifier stages each comprises a pair of transistors coupled to a substantially constant current source, so that the total current conducted by both transistors of each such pair remains substantially constant.

6. A multi-level differential decoder for use in a data transmission system wherein binary interfaces formed by a plurality of binary input signals are respectfully encoded as multi-level differential interfaces formed by a plurality of code signals of a multi-level code, said code signals having code values corresponding to respectively different levels of said code and being respectively transmitted over respective transmission channels; said decoder comprising:

means for receiving a multi-level interface formed by the transmitted code signals and converting it into a binary interface formed by a plurality of binary output signals, the respective binary output signals being assigned binary values corresponding to the signs of the differences between the code values of respective pairs of said multi-level code signals;

the relation between the binary values so assigned to said binary output signals and said sign differences being as provided by a pre-selected code conversion table such that the binary interface formed by said binary output signals is the same as the binary interface corresponding to the multi-level interface formed by the transmitted code signals; and means for supplying the respective binary output signals to respective outputs of said decoder.

7. A decoder as claimed in claim 6 comprising a succession of differential amplifier stages, the respective stages receiving said respective pairs of multi-level code signals and deriving therefrom the respective binary output signals in accordance with said pre-selected code conversion table.

8. A decoder as claimed in claim 7 wherein said differential amplifier stages each comprise a pair of transistors coupled to a substantially constant current source, so that the total current conducted by both transistors of each such pair remains substantially constant.

9. A method of effecting differential transmission over a plurality (m) of transmission channels, $w_1, w_2, \ldots w_m$, of a binary interface formed by a plurality (p) of binary input signals, m being less than 2p; such method comprising encoding the input binary interface to form a corresponding multi-level differential interface having (m) multi-level signals, and transmitting the respective multi-level signals over the respective channels; said encoding comprising the steps of:

(1) assigning to the multi-level signal transmitted over channel $w_1$ a value which is at any of a plurality (m) of different levels;

(2) for any channel $w_i$ from $w_2$ to $w_{m-1}$, assigning to the multi-level signal transmitted over such channel a value which is at one of said (m) levels and which differs from the values assigned to the multi-level signals transmitted over channels $w_1$ to $w_{i-1}$; and (3) assigning to the multi-level signal transmitted over channel $w_m$ a value which is at the signal level remaining channels $w_1$ to $w_{m-1}$;

whereby the values of the respective transmitted multi-level signals are determined by the signs of the differences between the values of respective pairs of such signals.

10. A method as claimed in claim 9, wherein the values assigned to the respective multi-level signals respectively correspond to the arithmetic sum of the binary values of at least a pair of said transmitted binary signals, such correspondence being in accordance with a pre-selected code conversion table.

11. A method as claimed in claim 9, further comprising decoding the multi-level interface formed by the (m) multi-level signals to derive (p) binary output signals which form a binary interface the same as the transmitted binary interface, said decoding comprising the steps of:

(1) detecting the signs of the differences between the values of respective pairs of said multi-level signals; and (2) assigning binary values in accordance with the signs so detected to each of the (p) binary output signals, the relationship between said signs and said assigned binary values being in accordance with the inverse of said code conversion table.

12. A data transmission system for differential transmission over a plurality of transmission channels of binary interfaces formed by a plurality of binary input signals, the number of channels being less than twice the number of binary input signals; said system comprising:

an encoder for encoding a binary interface formed by the binary input signals into a multi-level interface formed by a plurality of code signals of a multi-level code, the respective code signals being assigned values corresponding to respectively different levels of said multi-level code; the code value so assigned to any code signal being in accordance with a combination of the binary values of at least a pair of the binary input signals, the relation between the code values so assigned and said combination of binary values being as provided by a pre-selected code conversion table; said encoder supplying the respective code signals to the respective transmission channels; and a decoder for receiving the multi-level code signals from said transmission channels and converting a multi-level interface formed thereby into a binary interface formed by a plurality of binary output signals, the respective binary output signals being respectively assigned binary values corresponding to the signs of the differences between the code values of respective pairs of said multi-level signals, the relation between the binary values so assigned to said binary output signals and said sign differences being as provided by the inversion of said pre-selected code conversion table;

whereby the binary interface formed by the binary output signals of said decoder is the same as the binary interface formed by the binary input signals to said encoder.

* * * * *